Sept. 5, 1944.   H. G. ORSER ET AL   2,357,537
PROCESS OF BENDING GLASS SHEETS
Filed Feb. 3, 1942

Inventors
HORACE G. ORSER.
WILLIAM P. BAMFORD.
By Frank Fraser
Attorney

Patented Sept. 5, 1944

2,357,537

UNITED STATES PATENT OFFICE 2,357,537

PROCESS OF BENDING GLASS SHEETS

Horace G. Orser, Perrysburg, and William P. Bamford, Maumee, Ohio, assignors to Libbey-Owens-Ford Glass Company, Toledo, Ohio, a corporation of Ohio Application February 3, 1942, Serial No. 429,394

4 Claims. (Cl. 49—84)

Our invention relates broadly to the bending of glass and more particularly to an improved process of bending glass sheets or plates in pairs to be subsequently bonded with an interposed layer of thermoplastic to form laminated safety glass.

In order to properly bend glass sheets in pairs so that they will accurately fit one another when subsequently laminated with the plastic interlayer, it has been customary to interpose between the two glass sheets during bending a spacer sheet of substantially the same thickness as the layer of plastic with which the glass sheets are to be subsequently bonded. The use of a spacer sheet is particularly important when a relatively thick plastic interlayer is used. This spacer has frequently consisted of a third sheet or light of glass which has been discarded after the bending operation.

To assure that the two outer glass sheets and interposed glass spacer sheet will not fuse to one another during bending, it has been the usual practice to provide a relatively thin layer of a suitable "parting" material between the adjacent glass sheets which will prevent adherence therebetween upon heating to the temperature required for bending. Several different types of coatings have been used, such as, for example, a mixture of whiting and water or baking soda and water. The coating has also been formed of a water solution of "Varcel," which is a trade-name for finely divided diatomaceous earth, usually referred to as fresh water diatomite. While these coatings may be applied to the glass sheets in any desired manner, they are ordinarily sprayed thereon.

Heretofore, the outer glass sheets and interposed glass spacer sheet have been usually assembled for bending in the following manner:

First, one of the outer glass sheets was placed upon a support and the upper surface thereof coated with the parting material, such as by spraying a relatively thin layer of the material thereon. The glass spacer sheet was then laid upon the first sheet and the upper surface thereof also coated, after which the third glass sheet was placed upon the spacer sheet. The three sheets of glass were then placed upon a mold and heated in a furnace to a temperature sufficient to cause the sheets to become softened and to drop or settle down into the mold and take the shape thereof. The glass spacer sheet was then removed and discarded and the top and bottom sheets laminated with a layer of plastic material to form a sheet of safety glass.

It is of course important that the parting material be of such character that it will not chemically combine with the glass, will not etch or otherwise mar the glass surface, and will not decompose upon being subjected to bending temperatures. It was found that in making relatively simple bends, coating materials of the above type could be satisfactorily used and that the glass sheets coated in the above manner were in no way adversely affected thereby during the bending operation. However, it was discovered that when making relatively difficult or sharp bends, including spherical, semi-circular, and compound shapes, the bottom sheet of glass, after bending, had a decidedly cloudy or smoky appearance whereas this was not true of the top sheet.

When making the more difficult or sharper bends, it is necessary either to subject the glass sheets to the usual bending temperatures for a relatively longer period of time or to increase the bending temperatures with a shorter time cycle. It might be pointed out that for ordinary bends the temperature of the bending furnace is maintained at around 1150 to 1180 degrees Fahrenheit, whereas in making more difficult bends, the bending temperature may be increased to from 1250 to 1300 degrees Fahrenheit. When the glass sheets are allowed to remain in the bending furnace for a longer period of time or are subjected to relatively higher bending temperatures, the glass naturally becomes softer, and we discovered that under such conditions there was a tendency for the coating material to become fused to or embedded in the glass sheets. We further discovered that while the coating material tended to fuse or bond to the glass sheet to which it was applied, it did not, for some unexpected and unaccountable reason, become fused to the glass sheet with which the coating material contacted but to which it was not initially applied. Thus, we found that the bottom glass sheet had a decidedly cloudy or smoky appearance because the coating material was applied directly thereto, whereas the clarity of the top glass sheet was unaffected by the coating material applied to the upper surface of the glass spacer sheet.

It is the aim of this invention to apply the coating material to the glass sheets in such a manner that the inner surfaces of the top and bottom sheets, which are subsequently used in making safety glass, will not be marred or otherwise adversely affected by the coating material during the bending operation, even though subjected to increased bending temperatures or lengthened bending cycles.

Other objects and advantages of the invention will become more apparent during the course of the following description, when taken in connection with the accompanying drawing.

In the drawing, wherein like numerals are employed to designate like parts throughout the same:

Figures 1, 2:
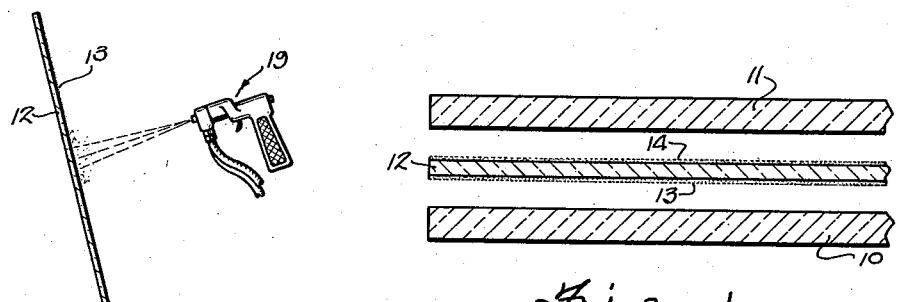
Fig. 1 is a transverse section showing a pair of outer glass sheets and interposed glass spacer sheet properly assembled for bending but spaced from one another.
Fig. 2 is a diagrammatic view illustrating the spraying of the coating material upon the glass spacer sheet.

With reference now to the drawing, there is illustrated in Fig. 1 an assembly comprising two outer sheets of glass 10 and 11 and an interposed spacer sheet 12 also of glass; the opposite surfaces of said spacer sheet having applied thereto a relatively thin layer or coating of a suitable "parting" material as indicated at 13 and 14.

Figure 3:
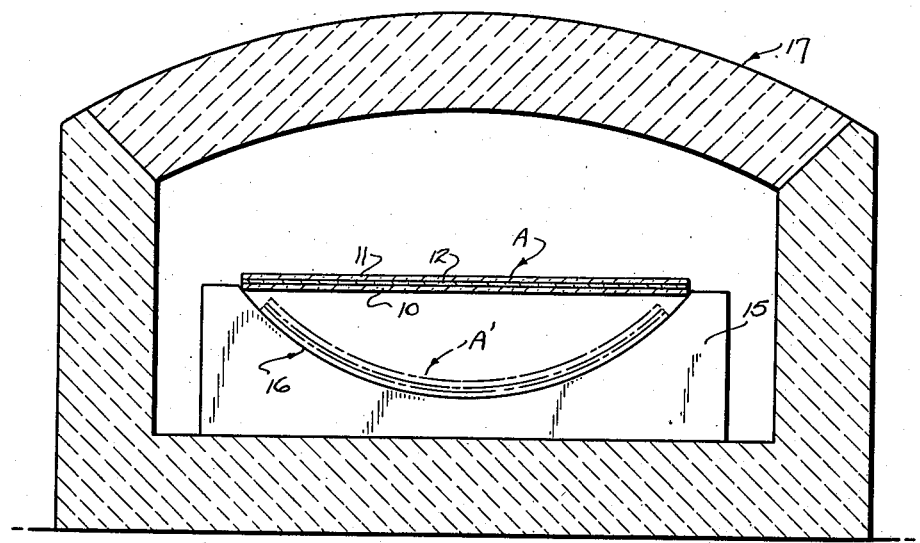
Fig. 3 is a sectional view through a bending furnace containing a mold upon which the glass sheets are bent.

In practice, the opposite surfaces of the glass spacer sheet 12 are first coated with the desired material, such as, for example, a water solution of "Varcel", after which the said sheet is placed between and in contact with the glass sheets 10 and 11 to complete the assembly indicated by the letter A in Fig. 3. This assembly is supported upon the mold 15 having a concave shaping surface 16 of a curvature corresponding to the curvature to which the glass sheets are to be bent. The mold and glass sheets are placed in a suitable bending furnace 17 which is heated in any desired manner at a temperature sufficient to cause the softening of the glass sheets, whereupon they will drop or settle down by their own weight into the mold and take the shape thereof as indicated at A'.

Figure 4:
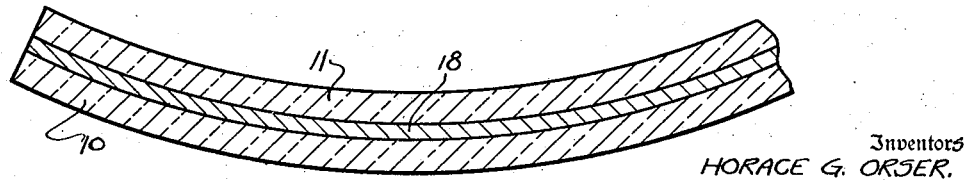
Fig. 4 is a transverse section through a sheet of laminated safety glass.

After the glass sheets have been properly bent, they are removed from the mold and the spacer sheet 12 removed. The two outer glass sheets 10 and 11 are then washed to remove any of the coating material which may be adhered thereto, after which they are bonded with an interposed layer of plastic material 18 (Fig. 4) to form a sheet of laminated safety glass.

As shown, the coating material is not applied to either of the outer glass sheets 10 and 11 but, instead, is applied to opposite surfaces only of the glass spacer sheet 12. The coating material can be applied to the spacer sheet in any desired manner, but it is preferably sprayed thereupon by means of a suitable spray gun 19 as shown in Fig. 2.

As previously pointed out, we discovered that there is a tendency for the coating material to fuse or bond to the glass sheet upon which it is initially applied when the said sheets are subjected to relatively high bending temperatures or to a lengthened bending cycle, such as is required in the making of relatively difficult or sharp bends. Also, that for some wholly unexpected reason the coating material does not fuse or bond to the glass sheets with which it contacts but to which it was not initially applied. Consequently, we found that by coating both surfaces of the glass spacer sheet only, the coating material, while tending to become fused to said sheet, does not fuse to the inner surfaces of the glass sheets 10 and 11 and that what does adhere thereto can be readily washed off. As a consequence, the inner surfaces of the outer glass sheets 10 and 11 are in no way marred nor is the clarity and transparency of the glass in any way adversely affected by the coating material. On the other hand, the glass spacer sheet has a decidedly cloudy or smoky appearance, but this is immaterial since the spacer sheet is discarded after the bending operation.

We claim:

1. In the bending of glass sheets wherein two outer sheets of glass and an interposed glass spacer sheet are supported one upon the other and bent simultaneously to a predetermined curvature, the step of applying to both surfaces of the glass spacer sheet only relatively thin layers of a material which will prevent the glass sheets from fusing to one another.

2. In the bending of glass sheets wherein two outer sheets of glass and an interposed glass spacer sheet are supported one upon the other and bent simultaneously to a predetermined curvature, the step of spraying onto both surfaces of the glass spacer sheet only relatively thin layers of a material which will prevent the glass sheets from fusing to one another.

3. The process of bending a pair of glass sheets simultaneously prior to bonding them together with an interposed layer of plastic material to form a composite safety glass structure, comprising selecting a glass spacer sheet having a thickness substantially equal to that of the proposed layer of plastic, applying to both surfaces of said spacer sheet a relatively thin layer of parting material, placing the coated glass spacer sheet between and in contact with two outer sheets of glass, bending the three sheets of glass simultaneously, and then discarding the spacer sheet.

4. The process of bending a pair of glass sheets simultaneously prior to bonding them together with an interposed layer of plastic material to form a composite safety glass structure, comprising selecting a glass spacer sheet having a thickness substantially equal to that of the proposed layer of plastic, spraying onto both surfaces of said spacer sheet a relatively thin layer of parting material, placing the coated glass spacer sheet between and in contact with two outer sheets of glass, bending the three sheets of glass simultaneously, and then discarding the spacer sheet.

HORACE G. ORSER.
WILLIAM P. BAMFORD.